United States Patent [19]

Mathauser

[11] 4,036,333
[45] July 19, 1977

[54] BICYCLE BRAKE SHOE WITH HEAT DISSIPATING MEANS

[76] Inventor: William R. Mathauser, P.O. Box 5, Sun Valley, Idaho 83353

[21] Appl. No.: 657,931

[22] Filed: Feb. 13, 1976

[51] Int. Cl.² .......................................... F16D 65/807
[52] U.S. Cl. .................................. 188/264 A; 188/24; 188/73.1; 188/250 B
[58] Field of Search ............ 188/24, 73.1, 73.6, 188/250 B, 250 G, 250 F, 251 R, 264 R, 264 A, 264 AA

[56] References Cited
U.S. PATENT DOCUMENTS

| 1,923,872 | 8/1933 | Loughead | 188/264 A |
| 2,388,123 | 10/1945 | Conradty | 188/251 R |
| 2,655,227 | 10/1953 | Eksergian | 188/264 AA |
| 2,699,228 | 1/1955 | Mennesson | 188/24 |
| 2,840,195 | 6/1958 | Holton | 188/264 R |
| 2,909,244 | 10/1959 | Kraft | 188/264 R |
| 3,366,200 | 1/1968 | Hayes | 188/250 B |
| 3,543,900 | 12/1970 | Colbert et al. | 188/73.1 |
| 3,776,333 | 12/1973 | Mathauser | 188/24 |
| 3,840,093 | 10/1974 | Hamayasu | 188/24 |

FOREIGN PATENT DOCUMENTS

| 983,448 | 6/1951 | France | 188/24 |
| 163,178 | 2/1904 | Germany | 188/24 |

Primary Examiner—Trygve M. Blix
Assistant Examiner—Edward R. Kazenske
Attorney, Agent, or Firm—Shoemaker and Mattare

[57] ABSTRACT

A brake for bicycles and the like, comprising a finned shoe having a pad of friction material thermally bonded thereto. The fins provide improved heat dissipation from the brake shoe, and the bonding provides improved heat transfer to the shoe. The pad is free on at least three sides so that heat is transferred away from the braking interface efficiently.

8 Claims, 18 Drawing Figures

U.S. Patent  July 19, 1977  Sheet 1 of 4  4,036,333
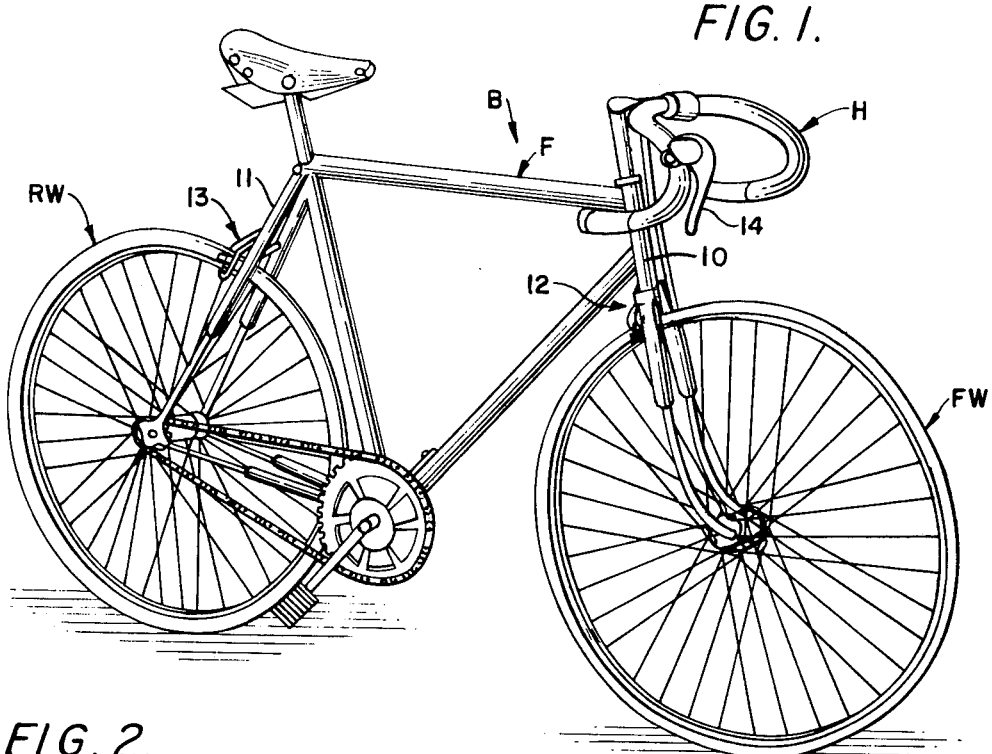
FIG. 1.
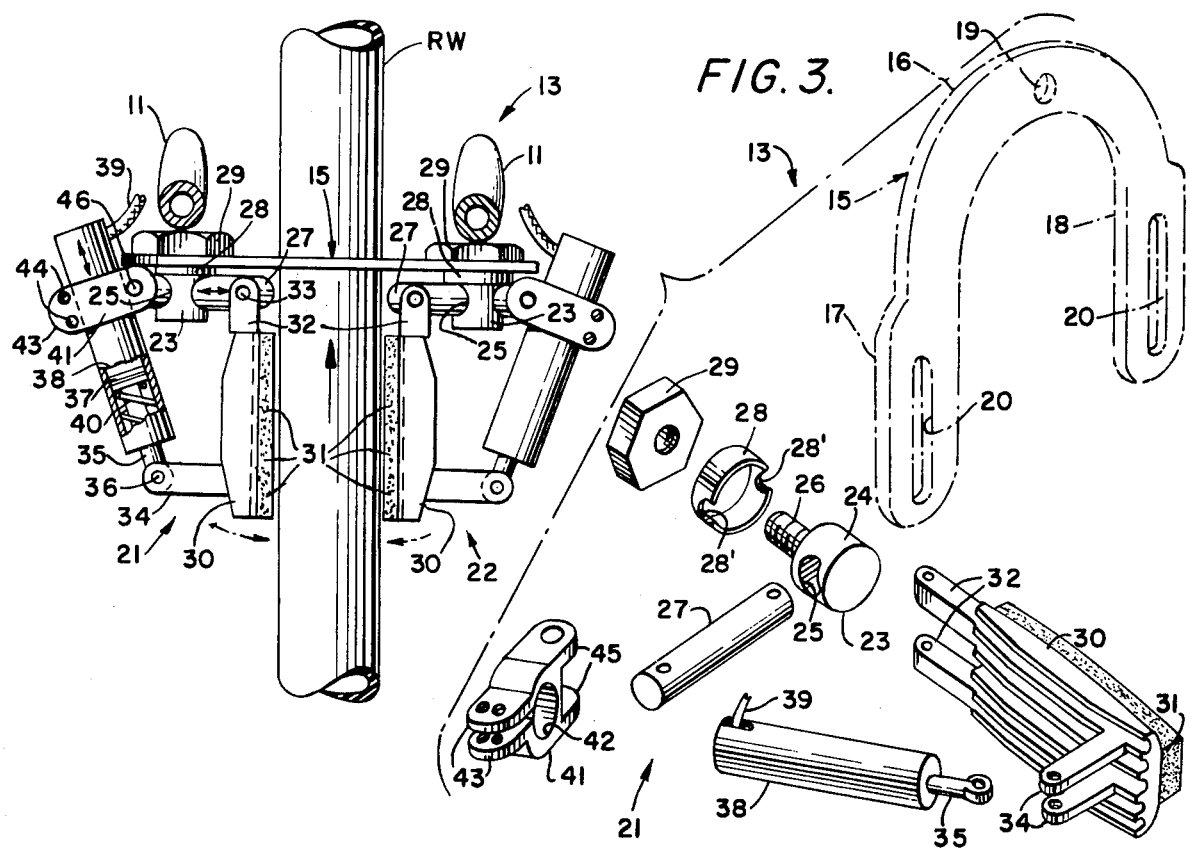
FIG. 2.
FIG. 3.

FIG. 7.
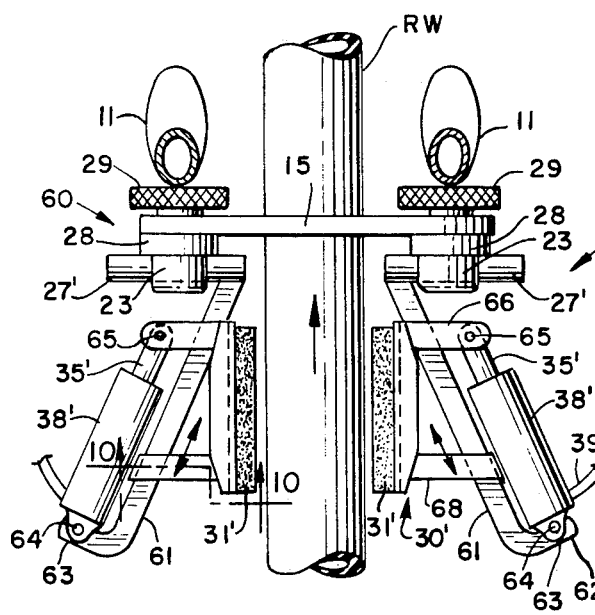
FIG. 8.
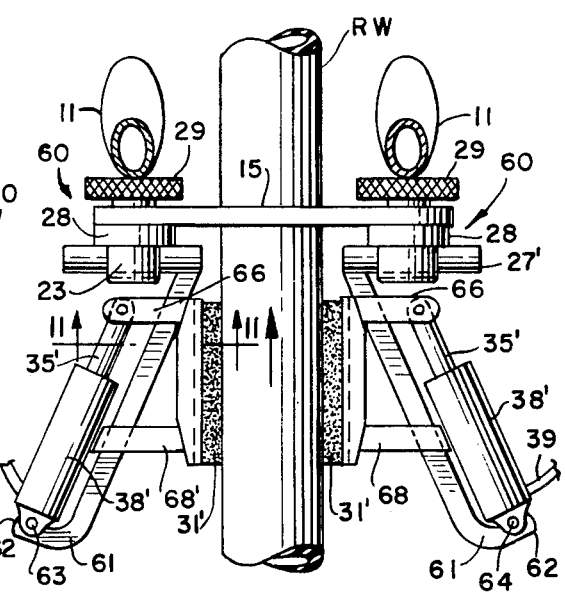
FIG. 9.
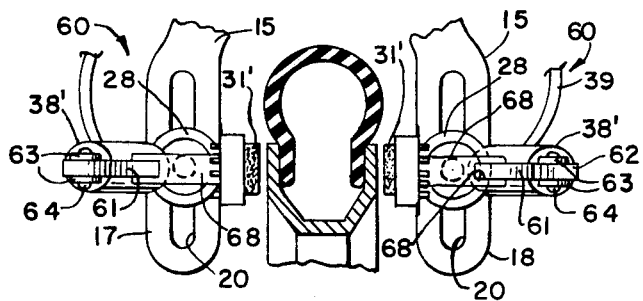
FIG. 10.
FIG. 11.
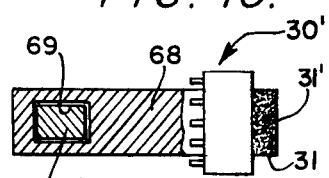
FIG. 12.
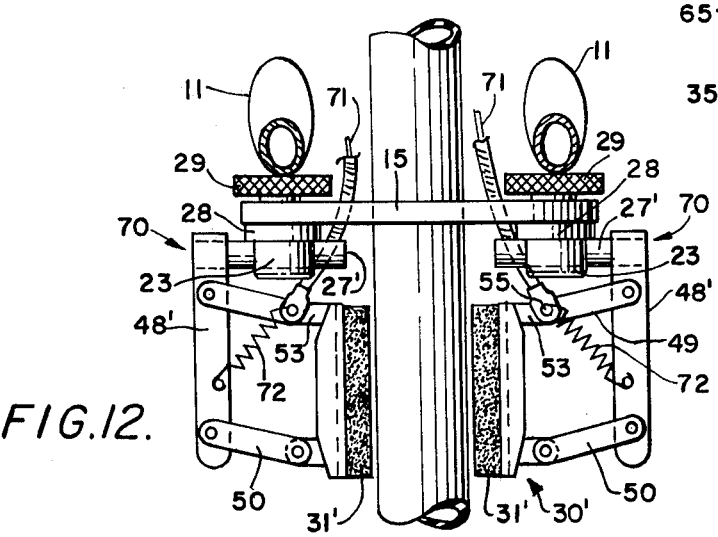

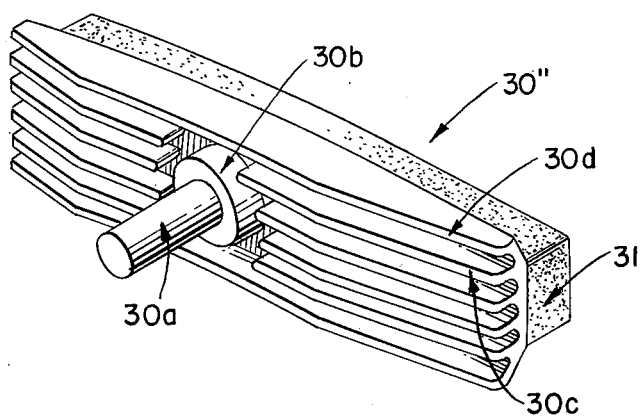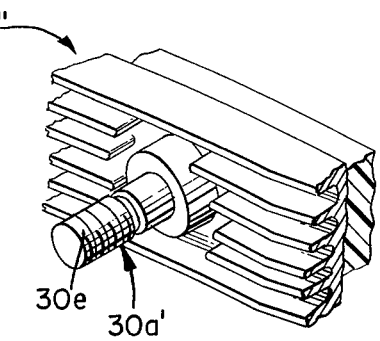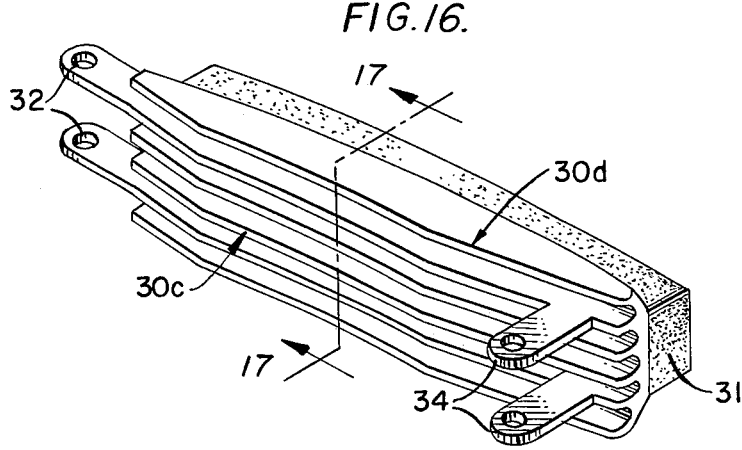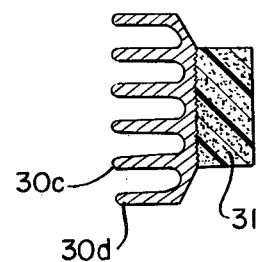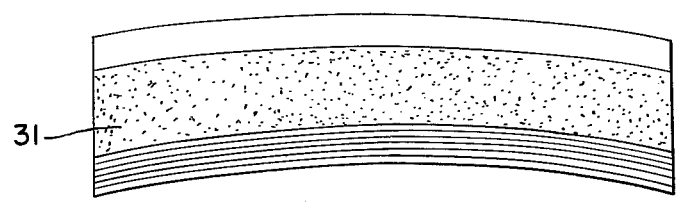

1

BICYCLE BRAKE SHOE WITH HEAT DISSIPATING MEANS

BACKGROUND OF THE INVENTION

This invention relates to bicycle brakes, and includes a brake having a finned brake shoe with a pad of frictional material secured thereto, the fins on the shoe provide improved dissipation of heat from the brake to atmosphere.

In the prior art, bicycle brakes are usually of the caliper type and are mounted on opposite sides of the rim of the wheel of the bicycle and are energized substantially perpendicular to the plane of the wheel into engagement with the rim thereof to slow of stop forward motion of the bicycle.

Additionally, prior art bicycle brakes typically comprise a block of friction material bonded or otherwise secured to a backing plate or support, and when braking effort is applied, the brake becomes heated, thus losing a considerable amount of its braking effectiveness. Notwithstanding this, cooling or prior art bicycle brakes is generally not provided for. However, a severe stop from high speed or down a long steep hill, after the friction material of the brake pad has heated up excessively may require more force than such a stop requires using a cooled brake. A severe stop from high speed or down a long steep hill, after the friction material of the brake pad has heated up excessively may not be as effective for a given amount of hand pressure on the brake lever because the coefficient of friction falls off rapidly as the friction material heats up. Thus, when long downhill grades are encountered, or under race conditions, when brakes are likely to become heated due to hard use, it is most important to reduce maximum friction material temperatures in order to maintain effective braking action.

Additionally, many known brake shoes comprise a metal housing into which is pushed or inserted a block of friction material. However, such housings do not efficiently transfer heat because of only a casual of intermittent contact between the shoe and the housing. Thus, the heat transfer rate if low due to the poor thermal contact between the shoe and the housing. Therefore, it is very important that the shoe, or housing, have a good heat transfer path to the atmosphere to at least partially compensate for the poor thermal contact between the friction material and the housing.

In the present invention, a finned shoe promotes a transfer of heat from the brake to atmosphere which is improved over the heat transfer from known brakes, and thus the effectiveness of the brake is maintained even under severe usage.

OBJECTS OF THE INVENTION

It is an object of this invention to provide a bicycle brake having a finned brake shoe for improved heat dissipation.

It is another object of the present invention to provide a finned brake shoe which is adaptable for use as a replacement part in any caliper-type bicycle brake system.

BRIEF DESCRIPTION OF THE DRAWINGS

FIG. 1 is a perspective view of a bicycle incorporating the brake arrangement including the brake shoe of the present invention.

FIG. 2 is an enlarged, fragmentary, plan view of one form of the brake using the brake shoe of the present invention, showing parts in section.

FIG. 3 is an enlarged, exploded, perspective view of the components of one form of a brake unit incorporating the present invention.

FIG. 7 is a view similar to FIG. 4 of a further form of a brake incorporating the brake shoe of the present invention.

FIG. 8 is a view similar to FIG. 7 with the brake of FIG. 7 in energized position.

FIG. 9 is a fragmentary sectional view in elevation of the brake of FIG. 7.

FIG. 10 is an enlarged, fragmentary, sectional view taken along line 10—10 in FIG. 7.

FIG. 11 is an enlarged, fragmentary, sectional view taken along line 11—11 in FIG. 8.

FIG. 12 is a view similar to FIG. 4 with a different type of actuating means for the brake of FIG. 4.

FIG. 14 is a perspective view of a brake shoe having a pad attached thereto according to the invention.

FIG. 15 is a perspective view of another embodiment of a brake shoe according to the teachings of the present invention.

FIG. 16 is a perspective view of another embodiment of a brake shoe according to the teachings of the present invention.

FIG. 17 is a view along line 17—17 of FIG. 16.

FIG. 18 is a side view of a brake pad which is curved to approximate the radius of a wheel rim with which the brake is associated according to the teachings of the present invention.

DETAILED DESCRIPTION OF THE INVENTION

Figure 4:
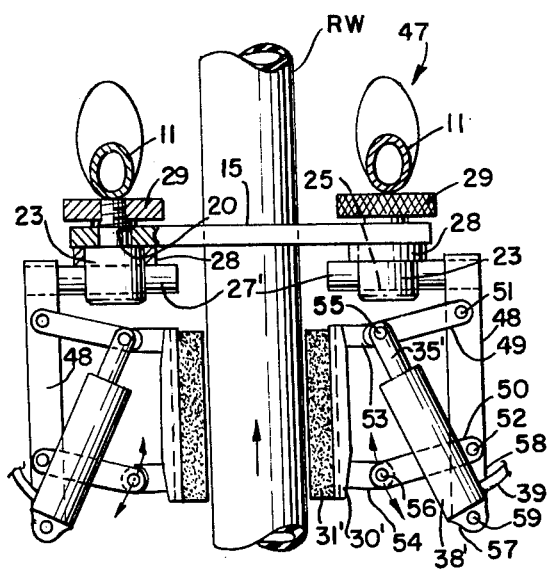
FIG. 4 is a view similar to FIG. 2 of a modified brake in its normal or unenergized position.

In the drawings, wherein like reference numerals indicate like parts through the several views, a bicycle B includes a frame F, handle bar H and front and rear wheel FW and RW, respectively, supported by front forks 10 and rear forks or frame stays 11, respectively. The brake shoe embodying the present invention is adaptable as a replacement part, or for use with a brake unit such as is disclosed in U.S. Pat. No. 3,921,746, the disclosure of which is hereby incorporated by reference.

A front brake unit 12 utilizing a brake shoe designed in accordance with the invention is supported on the front forks 10, behind the forks and in operative association with the front wheel FW, and a substantially identical rear brake unit 13 utilizing a brake shoe designed in accordance with the invention is supported on the rear frame stays or forks 11, behind the frame stays and in operative association with the rear wheel RW. The position of the brake units in the figures is for the sake of convenience, and is not intended to be limiting. Suitable hand operated actuating means 14 is supported on the handle bar H for actuating the brakes 12 and 13. The hand operated actuating means, in a preferred form of the brake unit, comprises a master cylinder filled with brake fluid and operatively connected with the front and rear brakes to operate the brake units. The master cylinder may be properly designed, in a known manner, to cause operation of the rear wheel brake prior to operation of the front wheel brake unit.

In FIGS. 2 and 3, a first form of a brake unit 13 which utilizes a brake shoe designed according to the invention is positioned to the rear of forks or stays 11 in operative association with the rear wheel RW of the bicycle, it being understood that the front brake unit 12 is substantially identically constructed, and the brake unit 13 comprises a generally inverted U-shaped mounting yoke 15 with a bight portion 16 and a pair of opposite, downwardly extending legs 17 and 18. An opening 19 extends through the center of the bight portion for receiving a bolt or the like therethrough to attach the yoke 15 to the rear forks or stays 11 of bicycle B, and an elongate, substantially vertically extending slot 20 is in a lower end portion of each of the legs 17 and 18.

A pair of substantially identical brake shoe units 21 and 22 are carried by the yoke 15 on opposite sides of the rear wheel RW in operative association with the rim of the wheel. Each unit comprises a take-up pin 23 having a diametrically enlarged head 24 with a diametrically extending bore 25 therethrough and a threaded bolt or extension 26 extending axially from one end thereof, said bolt or extension 26 projecting through the slot 20, with the enlarged head 24 to the rear of leg 17. An elongate, cylindrical adjustment pin 27 is slidably received through said bore 25 and a cylinder jam sleeve or collar 28 is received over said bolt 26 and the end of head portion 24 and is positioned to engage the pin 27 at opposite ends of bore 25. The collar 28 may have arcuate cut-outs 28' in opposite sides thereof, for engaging the side of pin 27, if desired. A nut 29 is threaded on the bolt against the front side of the yoke 15 to draw the take-up pin toward the yoke and thus jam and jam sleeve or collar 28 between the yoke and the adjustment pin 27 to jam or lock the adjustment pin in an axially adjusted position through the bore 25 and to jam or lock the pin 23 in a vertically adjusted position in the slot 20.

A pair of finned brake shoes 30, of a suitable material such as metal or the like, as for example aluminum, are shown in FIGS. 3 and 17, and are provided with a plurality of heat dissipating fins. The pair of brake shoes are positioned on opposite sides of the wheel, with the pads 31 in substantial parallelism with the plane of the wheel.

The brake pad 31 preferably comprises a friction material, such as plastic, natural or synthetic rubber, or nylon, or polyurethane, and the like, or other material, impregnated with metal particles M, such as flakes of copper or aluminum or the like, or both, or metal strands and the like, in sufficient quantity and close proximity to one another for maximum dissipation of heat from the rim of the wheel, through the brake pad into the fins and thence to the atmosphere. Preferably, the friction material is synthetic rubber impregnated with iron oxide particles, and the metal particles are in close proximity with each other. This dissipation of heat is particularly important when riding the bicycle down long grades or when carrying a heavy load, and the like. The pad of friction material is shown in FIGS. 14–18 to be approximately parallelepiped shaped.

A pair of spaced apart, axially extending mounting arms 32 extend from one end of a first form of the brake shoe 30 shown in FIGS. 3 and 16 and, as shown in FIG. 3, are positioned on opposite sides of the adjustment pin 27, and the brake shoe is pivotally secured to the pin 27 by means of a pivot pin 33, or the like, extended through the arms 32 and the pin 27. A pair of spaced apart, laterally extending ears or lugs 34 project from the side of brake shoe 30 opposite the pad 31 near the other end of the brake shoe 30, and an actuating rod 35 extends between the ears 34 and is pivotally connected thereto by means of a pivot pin 36, or the like, extended through the ears and an eye formation at the end of the rod 35. The rod 35 is connected to a piston 37 within a cylinder 38, to be reciprocably operated by the piston upon introduction of pressurized brake fluid to the cylinder through a fluid conduit 39 connected with the actuating means 14 on the handle bar H of the bicycle. A suitable return spring 40 is engaged between the piston and the end of the cylinder for returning the piston to a retracted position to retract the pads 31 from the rim of the wheel.

Other forms of the brake shoe according to the present invention are shown in FIGS. 14 and 15. The FIG. 14 embodiment shows a brake shoe 30" having a centrally located mounting stud 30a fixed thereto at a base 30b. Inner fins 30c and outer extensions 30d which are angled toward the fins 30c have dimensions sufficient to accommodate the base 30b. The stud 30a extends outwardly from the shoe 30" and in a direction opposite to that direction in which pad 31 is presented.

The FIG. 15 embodiment is identified by the numeral 30''' and comprises a threaded mounting stud 30a' having external threads 30e on one end thereof. As shown in FIG. 16, the arms 32 and ears 34 are attached to one end of the inner fins 30c. However, the arms and ears can also be attached to the outer fins 30d without departing from the teachings of the present invention.

FIG. 18 shows a slightly curved brake shoe and slightly curved brake pad. The radius of curvature of the brake pad is selected so that the pad is curved to approximate the radius of the rim of a wheel with which the pad is associated. The radius can be selected so that all, or any amount, of the pad contacts the wheel rim during a braking process.

Figure 6:
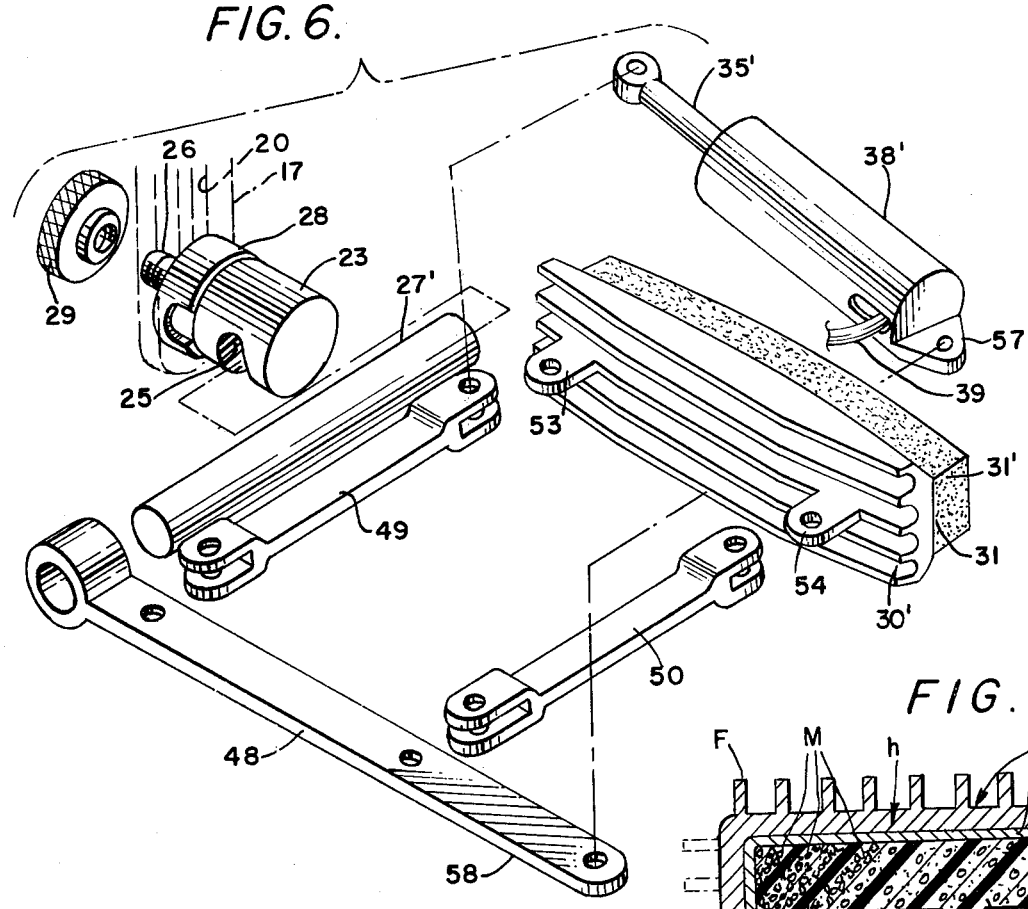
FIG. 6 is an enlarged, exploded, perspective view of the modified brake of FIGS. 4 and 5.

As shown in FIGS. 3, 6 and 16, the lugs can be attached to either the fins, or at the base to the rear face of the shoe.

The various forms of the brake shoes are adaptable for use with the several forms of brake units disclosed herein, as well as for replacement parts on known brake units.

Figure 13:
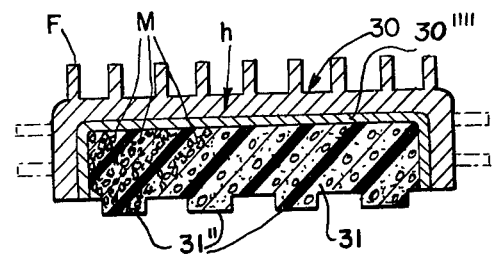
FIG. 13 is an enlarged, sectional view of a brake shoe which fits in a housing according to one form of the invention.

It is also contemplated that an alternative embodiment of the brake shoe of the present invention can be incorporated into a housing h such as the housing disclosed in U.S. Pat. No. 3,921,764. This alternative form is illustrated in FIG. 13. In such a form, a shoe would be comprised of a thin, strip of metal 30'''' with a friction pad bonded thereto and which is fit into the housing in a manner which produces a good thermal contact between the shoe disclosed in the just-referenced patent. The pad can have a plurality of spaced apart ridges 31" along one side thereof and which project through an open front of the housing. Fins, such as F, can be on a backwall of the housing as shown in the solid lines in FIG. 13, or on the side walls of the housing as shown in FIG. 13 in phantom lines, or both.

A brake unit incorporating the brake shoe of the present invention is a simply manufactured item which presents a clean appearance as compared to presently known brake units. Brake units incorporating the present brake shoe also are lightweight, cheap and comprise few parts as compared to known units. The heat transfer characteristics resulting from the good thermal contact between the friction pad and the brake shoe are much improved over the heat transfer characteristics of known units.

The pad of friction material is preferably bonded to the shoe to produce good thermal contact between those two elements. However, other forms of attachment between the pad and the shoe are possible as long as there is good thermal contact between the pad and the shoe.

Again referring to FIGS. 1-3, a bifurcated clamping bracket or sleeve 41 has a central opening 42 therethrough in which the cylinder 38 is slidably received. A pair of laterally protruding clamping jaws or ears 43 project from one side of the sleeve 41, and a pair of threaded clamping screws 44 are threadably engaged in the ears 43 to clamp the sleeve about the cylinder 38 to securely hold the cylinder in axially adjusted position in the sleeve 41. A pair of spaced apart, laterally projecting attaching ears 45 protrude from the other side of the sleeve 41, and the other end of adjustment pin 27 is received therebetween and pivotally secured thereto by a pivot pin 46 extended through the ears 45 and pin 27. Thus, suitable adjustment of the brake shoes relative to the wheel is quickly and easily accomplished. Preferably, the pad 31 of each shoe is positioned substantially parallel to the plane of the wheel, and the pin 27, cylinder 38, and brake shoe 30 define a triangular arrangement, so that when the brakes are actuated and the pads contact the rim of the wheel, frictional drag between the pads and rim energizes the brakes into more firm engagement with the rim of the wheel to slow or stop the bicycle with a minimum amount of effort on the part of the person riding the bicycle. As the pads become worn, the nut 29 may be loosened, enabling the adjustment pin 27 to be moved toward the wheel, and the screws 44 may be loosened to enable the cylinder to be moved toward the wheel, to properly position and adjust the pads relative to the rim of the wheel.

The yoke 15 is enabled to pivot from side to side about the bolt received through opening 19 to provide an equal braking force on each side of the wheel, and the dimensions of the brake unit and supporting structure relative to the wheel are such as to prevent lock-up or jamming of the brake unit when it is energized, although the brake unit is capable of being locked to stop the bicycle if maximum braking pressure is applied. Further, the brake shoe material is preferably of a commercially available anti-self-locking type to enable the brake shoe to retract from the wheel under the influence of spring 40, when pressure is removed from the actuator.

Figure 5:
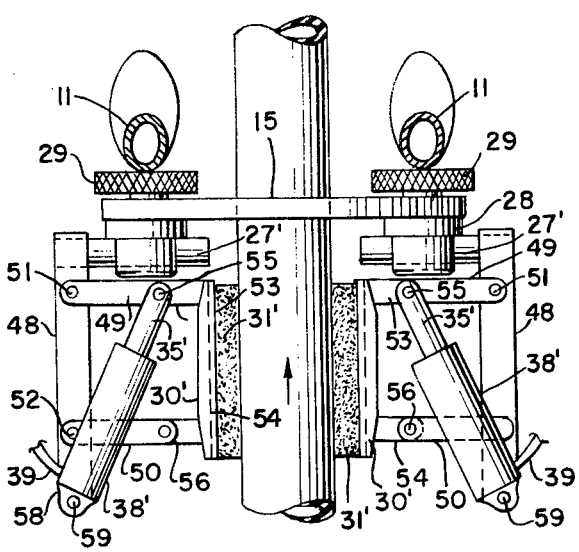
FIG. 5 is a view similar to FIG. 4 with the brake in an energized position.

A modified self-energizing brake unit is denoted by the numeral 47 in FIGS. 4 through 6 and is supported on the rear forks or stays 11 of the bicycle B by means of a yoke 15, take-up pin 23, jam sleeve or collar 28 and nut 29, and is adjustably secured on the yoke 15 in slots 20 in a manner similar to the first disclosed form of the brake unit. As in the first form of the brake unit, the front brake unit 12 is substantially identical with the rear brake unit, and accordingly, only the rear brake unit 13 will be described.

An adjustment pin 27' is adjustably clamped in bore 25 of take-up pin 23 by the jam sleeve 28, and an elongate support bar 48 is suitably secured at one end thereof to the other end of adjustment pin 27' and extends substantially perpendicular thereto. A pair of parallel support arms 49 and 50 are pivotally connected at one of their ends to the bar 48, adjacent opposite ends of the bar, by means of pivot pins 51 and 52, respectively. An elongate, substantially rectangular brake shoe 30' has a pair of upstanding lugs 53 and 54 attached to the fins thereof adjacent opposite ends thereof and the other ends of arms 49 and 50 are pivotally connected thereto by means of pivot pins 55 and 56, the brake shoe 30', brake pad 31', bar 48 and arms 49 and 50 defining a parallelogram linkage. A cylinder 38 has an axially extending mounting lug 57 on one end thereof, and said lug is pivotally connected to an extended end portion 58 of the bar 48 by means of a pivot pin 59, or the like. An actuating rod 35' extends from the other end of cylinder 38' and is pivotally secured to lug 53 of brake shoe 30' by means of pivot pin 55, so that when pressure fluid is admitted to cylinder 38' through conduit 39, the rod 35' is extended and the brake shoe 30' is swung forwardly and toward the rim of the wheel RW to engage the rim and slow or stop the bicycle. As in the previous form of the brake unit, when the brake pad engages the rim of the wheel, the friction drag between the brake pad and rim energizes the pad into more firm engagement with the rim of the wheel so that less force is required by the rider of the bicycle to operate the brake. Also, as in the previous form of the brake unit, the components comprising the brake may be of lightweight construction, since the force imposed on the brake when it engages the wheel is transmitted directly through the take-up pin 23 and nut 29 to the forks or stays 11 of the bicycle. Further, the length of arms 49 and 50, and the arrangement of pivot points is such that the brake unit will not become jammed when energized, and will return to a normal position out of engagement with the rim of the wheel under the influence of spring 40 as in FIG. 2.

Vertical adjustment of this form of the brake unit incorporating the invention is accomplished in the same manner as before, simply by loosening nut 29 and sliding the take-up pin 23 vertically in slot 20 of yoke 15, and adjustment of the brake shoes toward and away from the wheel is quickly and easily accomplished by loosening nut 29 and sliding adjustment pin 27' in the bore 25 of take-up pin 23.

A third embodiment of self-energizing brake unit, denoted by the numeral 60 is illustrated in FIGS. 7 through 11, and is secured to the frame of the bicycle with a yoke 15, take-up pin 23, adjustment pin 27' and jam sleeve 28 substantially similarly to the way in which the previously described forms of the brake units are secured to the bicycle frame. In this form of the brake unit, a brake shoe support rail or slide 61 is secured at one end thereof to one end of the adjustment pin 27' and extends angularly outwardly from the plane of the wheel and has a laterally outwardly turned end portion 62 thereon, to which a flange 63 on one end of a cylinder 38' is secured by means of a pivot pin 64 or the like extended through the flange 63 and through the laterally turned end portion 62 of rail 61. The cylinder 38' extends substantially parallel to the rail 61 and an actuating rod 35' extends substantially axially from the other end of the cylinder and is pivotally secured by means of a pivot pin 65 to the bifurcated end of an upstanding arm 66 projecting laterally from the rear of brake shoe 30' near one end thereof. As in the other forms of the brake unit, the arm 66 can be secured either to the fins or to the rear face of the brake shoe. The arm 66 has a guide bore 67 therethrough near the base thereof, and the rail 61 is slidably received therein. The other end of the brake shoe 30' is supported by an arm 68 attached to the shoe in a fashion similar to arm 66, and extending laterally from the other end of brake shoe 30'. The arm 68 has a guide bore 69 therethrough, in which the rail 61 is slidably positioned. Accordingly, as the cylinder 38' is supplied with pressurized fluid, the rod 35' is extended, pushing the arm 66 forwardly and toward the wheel and the arm 68 slides along rail 61 to maintain the brake pad in parallel relationship to the rim of the wheel as the pad moves into engagement with the rim. As in the previously described forms of the brake unit, engagement of the brake pad with the rim of the wheel energizes the pad into even more firm engagement with the wheel to slow or stop the bicycle with a minimum amount of effort on the part of the rider of the bicycle.

Adjustment of the brake unit 60 relative to the wheel is accomplished in substantially the same manner as in the brake units disclosed above in FIGS. 1 through 6.

A fourth form of self-energizing brake unit is denoted by the numeral 70 and is shown in FIG. 12. The brake unit 70 is supported on the rear frame stays 11, or on the front forks, as in the previously described brake units, by means of the yoke 15, take-up pin 23, jam sleeve 28 and nut 29. As in the form of the brake unit illustrated in FIGS. 4 through 6, brake unit 70 includes an adjustment pin 27', adjustably secured in the bore 25 in take-up pin 23, and a support bar 48' is suitably affixed at one end thereof to one end of the take-up pin 27'. A pair of parallel arms 49 and 50 are pivotally secured to the bar adjacent opposite ends thereof and a brake shoe 30' is pivotally secured to the other ends of the arms in a fashion similar to the other embodiments of the brake shoe to be in parallel relationship to the plane of the wheel. However, rather than the hydraulic actuating means 38' of FIGS. 4 through 6, a cable actuator 71 is secured to the arm 49 and lug 53 on the brake shoe 30' by means of a pivot pin 55, for actuating the brake shoe toward the wheel. A return spring 72 is connected between the bar 48' and the pivot pin 55 for returning the brake shoe to its disengaged position.

This form of brake is also prevented from jamming, since engagement between the take-up pin 23 and arm 66 on brake shoe 30; limits forward travel of the brake shoe.

Each of the brake shoes illustrated and described herein has cooling fins associated therewith, and the metal particles impregnated plastic or rubber material is preferably used as the brake pad material. The brake shoes are adaptable to a wide variety of brake unit forms, including those illustrated herein, as well as others. Further, each form of the brake unit may be cable actuated or hydraulically actuated, as desired, and other arrangements for supporting the brake shoes relative to the wheel may be utilized rather than the specific support and actuating arrangements described and illustrated, such as, for example, a cam actuator. Further, the particular arrangement of parts in each form of the brake unit described herein, and particularly the adjustment pin 27 in take-up pin 23, enables the brake shoes to be easily angularly adjusted to accommodate different designs of wheel rims. Moreover, in each form of the ivention, and as previously noted, the brake units are supported on the rear of either the rear frame stays or the front forks, and the force transmitted to the brake units is transferred directly to the frame of the bicycle so that lightweight components may be used in the construction of the brake and excessive stresses and forces are not put on the brake components when the brakes are actuated to slow or stop the bicycle. Also, the hydraulic actuators could comprise bellows units or the like, rather than the piston and cylinder arrangement disclosed, and the hydraulic system for the brakes can be a factory-sealed unit, if desired.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

What is claimed is:

1. A brake means comprising a brake shoe which includes a backing plate having a flat central portion with a plurality of cooling fins on one side thereof and integral extension portions extending outwardly from opposite edges of said central portion and being angled toward said one side for dissipating heat generated in the brake shoe by a braking action to the atmosphere, an elongate parallelepiped pad of friction material having only one face bonded on the other side of the shoe backing plate in thermal contact therewith, all of the other faces of said pad being free of contact with said backing plate with one free face oriented for engagement with a rim of a wheel and the like during the braking action and being longitudinally curved to approximate the radius of curvature of the wheel rim, said friction material having heat transfer means dispersed therein for transferring heat therethrough and said pad having a transverse dimension substantially smaller than that of said backing plate so that the backing plate extension portions extend outwardly of said pad on both sides thereof, said heat transfer means, said thermal bonding, said fins and said backing plate cooperating to transfer heat away from said one free face during the braking action.

2. A brake means as in claim 1, wherein the shoe backing plate is made of metal.

3. A brake means as in claim 2, wherein the shoe backing plate is made of aluminum to have high heat transferring properties.

4. The brake means of claim 1 further including attaching means on the brake shoe for attaching the brake shoe to a brake unit.

5. The brake means of claim 4 wherein the attaching means includes a threaded stud extending outwardly from the brake shoe.

6. The brake means of claim 4 wherein the attaching means includes a pair of arms having holes defined therein.

7. The brake means of claim 4 wherein the attaching means includes a smooth stud extending outwardly from the brake shoe.

8. The brake means of claim 4 wherein the attaching means includes means for adjusting said brake shoe and into which a stud fits.

* * * * *